(12) United States Patent
Osborn et al.

(10) Patent No.: US 12,413,410 B2
(45) Date of Patent: Sep. 9, 2025

(54) MANAGING USER DATA FOR DIFFERENT PLATFORMS

(71) Applicant: Capital One Services, LLC, McLean, VA (US)

(72) Inventors: Kevin Osborn, Newton Highlands, MA (US); Imren Johar, Clifton, VA (US); Dennis Sean Brennan, Pleasanton, CA (US)

(73) Assignee: Capital One Services, LLC, McLean, VA (US)

( * ) Notice: Subject to any disclaimer, the term of this patent is extended or adjusted under 35 U.S.C. 154(b) by 387 days.

(21) Appl. No.: 18/064,393

(22) Filed: Dec. 12, 2022

(65) Prior Publication Data

US 2024/0195624 A1 Jun. 13, 2024

(51) Int. Cl.
*H04L 9/00* (2022.01)
*H04L 9/32* (2006.01)

(52) U.S. Cl.
CPC .............. *H04L 9/3213* (2013.01); *H04L 9/50* (2022.05)

(58) Field of Classification Search
CPC ........ H04L 9/3213; H04L 9/50; H04L 9/3239
See application file for complete search history.

(56) References Cited

U.S. PATENT DOCUMENTS

| 11,669,811 B2 * | 6/2023 | Ramasamy | .......... G06Q 20/223 |
| | | | 705/67 |
| 2019/0319794 A1 * | 10/2019 | Haldar | .................. H04L 9/3236 |
| 2022/0147971 A1 * | 5/2022 | Berkooz | .............. G06Q 20/206 |
| 2023/0108366 A1 * | 4/2023 | Tang | .................. G06Q 20/3829 |
| | | | 705/66 |

* cited by examiner

Primary Examiner — Hany S. Gadalla
(74) Attorney, Agent, or Firm — Foley & Lardner LLP

(57) ABSTRACT

Methods and systems are described here for porting accounts to multiple computing platforms. Blockchain technology may be used and in particular cryptographic tokens (e.g., non-fungible tokens) may be used. A cryptographic token may represent a user account and may enable usage of the cryptographic token to provide portability of the user account. An access control system may be used to perform operations described herein. The access control system may receive a request for using, at a computing platform, an account of the user. The request may include an identifier of a cryptographic token. The access control system may determine, based on the cryptographic token, that access to the user account may be permitted and the request may be fulfilled.

20 Claims, 7 Drawing Sheets

MANAGING USER DATA FOR DIFFERENT PLATFORMS

BACKGROUND

People have a plethora of different accounts with different service providers. For example, people have accounts related to video services such as Netflix®, financial accounts, and other suitable accounts. With rise of virtual platforms (e.g., the Metaverse, and others) people may want to use their accounts on those platforms. For example, a user may have an on-demand video service (e.g., Netflix) and instead of using that account with friends at home, the user may want to use the account within a particular platform (e.g., the Metaverse) to share a movie-watching experience with friends. At this time, it would be very difficult to enable this type of functionality because of privacy concerns, unauthorized access concerns, and other issues. That is, account portability may be an issue when users connect to virtual platforms, especially with the rise of Virtual Reality Headsets and Augmented Reality Headsets. In essence, a provider of such a service may not be able to properly authenticate a user through such virtual platform and provide a proper mechanism for the platform to connect to the service.

SUMMARY

Accordingly, a mechanism is desired to solve the problems described above. One mechanism to solve the account portability problem may use blockchain technology and in particular cryptographic tokens (e.g., non-fungible tokens). Therefore, methods and systems are described herein for creating cryptographic tokens to represent user accounts and enabling usage of those cryptographic tokens to provide portability of user accounts. An access control system may be used to perform operations described herein.

In particular, the access control system may receive, from a computing platform, an access request to be performed by a service. For example, a user at a virtual platform (e.g., the Metaverse) may desire to watch a video within the virtual platform. The video may be provided by an on-demand video provider. Thus, the access control system may receive a request to access the on-demand service so that the user is able to watch the video on the virtual platform. The access request may include several pieces of data. The access request may include an identifier of a cryptographic token that encodes encrypted instructions for interacting with the service (e.g., with the on-demand video service). In addition, the access request may include a device identifier of a client device that controls the cryptographic token via a cryptography-based storage application (e.g., an identifier that may be used to communicate with the client device of the user). Furthermore, the access request may include a service function to be performed by the service (e.g., a request to play a particular on-demand video).

The cryptographic token may have been created at the direction of the service provider or the user in combination with the service provider to enable account usage from multiple computing platforms. To generate the cryptographic token, the access control system may perform the following operations. The access control system may receive, from the client device storing the cryptography-based storage application (e.g. a client device that was pre-registered with the access control system), a token generation request for accessing the service. The token generation request may include a service identifier of the service (e.g., an identifier of a video on-demand service) and authentication data associated with the user (e.g., a username and a password to access the vide on-demand service). Thus, the access control system may generate a cryptographic token for the service in relation to the user based on the user's login credentials.

During the generation process, the access control system may determine, based on the service identifier, a plurality of functions that the service is enabled to perform. For example, a video on-demand service may perform searches for videos, video playback, playback control, listings of movies, and other suitable functions. In some embodiments, the functions may be on-screen controls that the user may interact with from within the computing platform (e.g., from within the virtual platform). The access control system may then encode the plurality of functions and the authentication data into the set of instructions for performing the plurality of functions. For example, the access control system may generate a data structure and store functions and function metadata within the data structure. The data structure may be a table that includes function identifier, function descriptions and function parameters to be sent to the service provider. For example, if a user interacts with the play button displayed on an application display, the computing platform may transmit a command to the service provider to play the on-demand video. In addition, the access control system may encrypt the functions as (e.g., the set of instructions for performing the functions) into the cryptographic token using a public key associated with the cryptography-based storage application. That is, only a client device that stores the matching private key will be enabled to decrypt the instructions.

Accordingly, once the cryptographic token is generated, the cryptographic token may be used as a portability mechanism on different computing platforms (e.g., different virtual platforms). Thus, when the access request is received, the access control system may retrieve, via a blockchain node of a blockchain, encrypted token data associated with a cryptographic token that enables a user to access the service. When the cryptographic token has been generated, the cryptographic token is committed to a blockchain where the cryptographic token may be accessed. The access control system may retrieve the cryptographic token and the data within the cryptographic token.

As discussed above, the data within the cryptographic token may be encrypted using a public key associated with a cryptography-based application of a user. Thus, the access control system may transmit, to a client device of the user (e.g., a client device that the user has registered with the access control system), a command to decrypt the encrypted token data into a set of instructions for interacting with the service. As discussed above, the set of instructions may include a plurality of functions enabled to be performed by the service. The access control system may then receive, from the client device, the set of instructions. The set of instructions may include different instructions that the service is able to perform. For example, as discussed above, for the video on-demand service, the instructions may include performing searches for videos, video playback, playback control (e.g., rewind, fast forward), listings of movies, and other suitable functions.

The access control system may then attempt to match the requested function to supported functions (e.g., functions retrieved from the cryptographic token). In particular, the access control system may determine a function within the set of instructions that corresponds to the access request. For example, the access control system may determine that the requested function is a playback function for a particular video.

The access control system may then put together a command that can be sent to the service to fulfill the request. In particular the access control system may transmit, to the computing platform in response to the access request, a function command that enables the computing platform to execute the function via the service. For example, the access control system may generate a command or a plurality of commands for the video on-demand provider to play a particular video.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
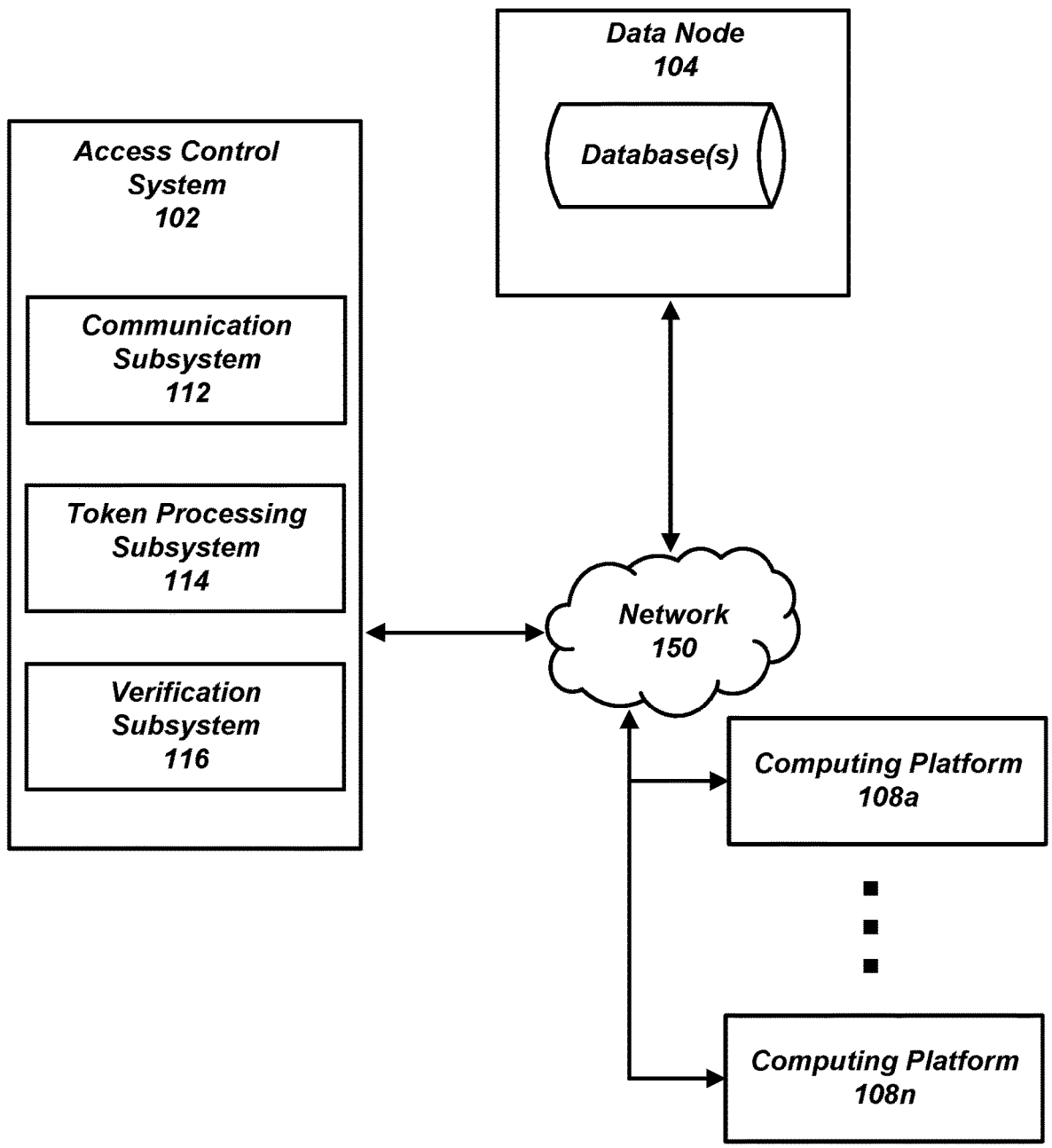
FIG. 1 shows an illustrative system for using cryptographic tokens to port account resources to multiple computing platforms, in accordance with one or more embodiments of this disclosure.

FIG. 1 is an example of environment 100 for using cryptographic tokens to port account resources to multiple computing platforms. Environment 100 includes access control system 102, data node 104, and computing platforms 108a-108n. Access control system 102 may execute instructions for using cryptographic tokens to port account resources to multiple computing platforms. Access control system 102 may include software, hardware, or a combination of the two. For example, access control system 102 may be hosted on a physical server or a virtual server that is running on a physical computer system. In some embodiments, access control system 102 may be configured on a user device (e.g., a laptop computer, a smart phone, a desktop computer, an electronic tablet, or another suitable user device). In some embodiments, access control system 102 may be hosted on a blockchain and may execute operations on a blockchain node. For example, access control system 102 may be a smart contract or another on-chain program that is being executed by a blockchain node. In some embodiments, access control system 102 may be hosted on an independent computing device and may send requests to the blockchain node to execute instructions (e.g., retrieve cryptographic tokens, mint cryptographic tokens, etc.).

Computing platforms 108a-108n may be platforms where a particular user has accounts. One of the platforms may be the Metaverse while another platform may be a particular multiplayer game world. Other types of computing platforms may be used with the disclosed access control system. Data node 104 may store various data, including user data (e.g., registration data for user/client devices), function data for each service available within the access control system 102, and/or other suitable data. Data node 104 may include software, hardware, or a combination of the two. For example, data node 104 may be a physical server, or a virtual server that is running on a physical computer system. In some embodiments, access control system 102 and data node 104 may reside on the same hardware and/or the same virtual server/computing device. Network 150 may be a local area network, a wide area network (e.g., the Internet), or a combination of the two.

Access control system 102 may receive, from a computing platform (e.g., a computing platform of computing platforms 108a-108n), an access request to be performed by a service. In some embodiments, access control system 102 may receive the access request using communication subsystem 112. Communication subsystem 112 may include software components, hardware components, or a combination of both. For example, communication subsystem 112 may include a network card (e.g., a wireless network card and/or a wired network card) that is associated with software to drive the card. The access control request may include a number of items. In some embodiments, the access control request may include an identifier of the cryptographic token that encodes encrypted instructions for interacting with the service. The access control request may also include a device identifier of the client device that controls the cryptographic token via a cryptography-based storage application. Alternatively or additionally, the access control request may include a service function to be performed by the service.

A cryptographic token may be a data structure hosted on a blockchain. The cryptographic token may be assigned to be controlled by a cryptography-based storage application (e.g., a cryptographic wallet). Some examples of cryptographic tokens include non-fungible tokens (NFTs) and fungible tokens. NFTs may be tokens generated based on the ERC-721 standard. A cryptography-based storage application is sometimes referred to as a cryptographic wallet. The cryptography-based storage application may store a private key associated with a corresponding user and may include software, hardware, or a combination of the two. For example, each cryptography-based storage application may include software executed on one or multiple devices or may include hardware such as a physical device. In some cases, the cryptography-based storage application may be software and may be stored in data nodes, and a user of the cryptography-based storage application may access the cryptography-based storage application online, e.g., via a browser. Alternatively or additionally, the cryptography-based storage application may reside on a general-purpose computer or on a special device (e.g., a fob) intended for storing the cryptography-based storage application. For example, the device may store private keys in a memory of the device and allow transactions to be completed on the device itself. Examples of cryptography-based storage applications may include cryptographic wallets. Devices may include any suitable end-user computing devices (e.g., desktop computers, laptops, electronic tablets, smart phones, and/or other computing devices used by end users) capable of transmitting and receiving data such as requests and/or like transactions.

In some embodiments, the access control request may be a request for a particular function to be performed, while, in some embodiments, the access control request may be a request to receive a set of available functions that may be performed from the computing platform (e.g., from a virtual platform). For example, the access control system may be used to perform a financial transaction (a particular function) with a virtual environment such as the Metaverse. A user may desire to acquire an item or a piece of real estate in the Metaverse and may want to use currency in a financial account being hosted by a particular financial institution. Different financial institutions may have different ways of accessing and using accounts. Thus, access control system 102 may use the cryptographic token to identify the correct function and enable the computing platform to move money from the financial account of the purchaser to a financial account of the seller. Thus, the purchaser is able to port the purchaser's financial account to the financial platform to purchase items.

In another example, a user of the computing platform may want to use a video on-demand account to search and view videos within the computing platform (set of particular functions). Thus, the computing platform may need to interact with the video on-demand service for various user commands (e.g., on-screen commands). Thus, the computing platform may need to access the video on-demand account on behalf of the user and proxy commands (e.g., on-screen commands) from the user to the video on-demand provider. In this instance, the computing platform may need the whole list of available functions and instructions on executing those functions against the service.

Figure 2:
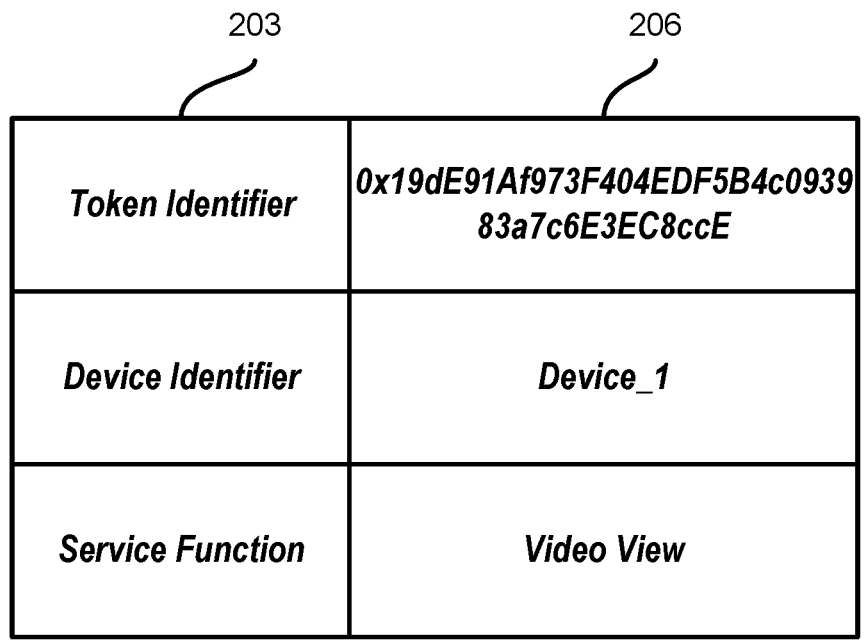
FIG. 2 illustrates a portion of a data structure for an access request, in accordance with one or more embodiments of this disclosure.

FIG. 2 illustrates a portion of data structure 200 for an access request. The access request may include field names 203 and field values 206. Field names 203 may include a token identifier field storing an identifier (sometimes referred to as an address) of the cryptographic token, a device identifier of a controlling device, and a service function requested. In some embodiments, the service function may be a request for multiple functions. For example, if there is a single service function request, that may be a request to transfer funds. Thus, the function may be for a transfer. However, if multiple functions are desired, for example, for watching a video (e.g., play, stop, pause, etc.), the service function may include a request for all or some of the available functions.

When the request is received, communication subsystem 112 may pass at least a portion of the data included within the request, or a pointer to the data in memory, to token processing subsystem 114. Token processing subsystem 114 may include software components, hardware components, or a combination of both. For example, token processing subsystem 114 may include software components (e.g., API calls) that access and/or execute programs such as on-chain programs to generate tokens (e.g., cryptographic tokens). Token processing subsystem 114 may retrieve, via a blockchain node of a blockchain, encrypted token data associated with a cryptographic token that enables a user to access the service. For example, token processing subsystem 114 may transmit the request (e.g., via communication subsystem 112) to the blockchain node. The request may include an identifier of the cryptographic token and a command to retrieve the data associated with the cryptographic token. The blockchain node, may retrieve the data and transmit it back to token processing subsystem 114. The received data may include encrypted token data. The encrypted token data may have been encrypted using a key (e.g., a public key) associated with a particular cryptography-based storage application owned by a user that has been given access to the particular account. Thus, the cryptographic token may have been generated at the request of a user that owns a particular account to be used on one or more computing platforms (e.g., virtual platforms).

Figure 3:
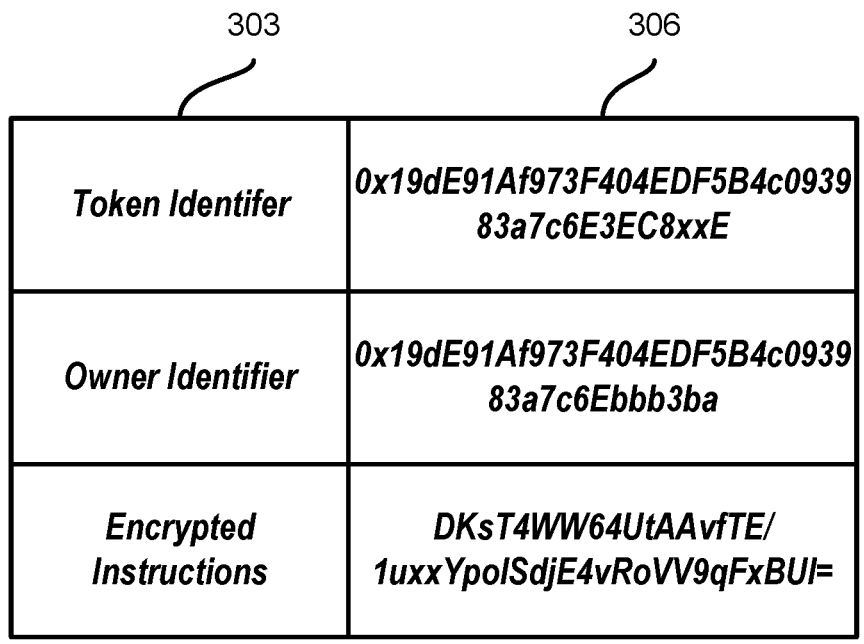
FIG. 3 illustrates a portion of a data structure representing a cryptographic token, in accordance with one or more embodiments of this disclosure.

FIG. 3 illustrates a portion of a data structure 300 representing a cryptographic token. Token field names 303 may represent field names for a token, while token field values may include values for those fields. For example, token field names 303 may include a field for a token identifier which may uniquely identify the token on the blockchain. Token identifiers are sometimes referred to as token addresses. Another field may be an owner identifier, which may identifier a cryptography-based storage application that owns (e.g., controls) the cryptographic token. For example, the owner identifier may be a string of 32 alphanumeric characters and may identify what is sometimes referred to as a cryptographic wallet. Some examples of hardware cryptographic wallets include Ledger®, and Trezor®. Software cryptographic wallets may include Metamask® and others. Furthermore, an encrypted instruction field may be included in token field names 303. This field may store encrypted instructions enabling usage of a particular account.

Those encrypted instructions may have been added to the cryptographic token during creation or an update. The cryptographic token may have been generated using the following operations. Access control system 102 may have received from a client device storing a cryptography-based storage application of an owner of a particular account (e.g., via communication subsystem 112) a token generation request for accessing a particular service via an account associated with the user. The token generation request may include a service identifier of the service and authentication data associated with the user. For example, access control system 102 may have received a request to enable access to a video on-demand service from a virtual platform. In some embodiments, access control system 102 may use token processing subsystem 114 to generate a new cryptographic token.

Token processing subsystem 114 may determine, based on the service identifier, the plurality of functions that the service is enabled to perform. For example, if the service is a video on-demand service, processing subsystem 114 may retrieve (e.g., from a database on data node 104) a plurality of functions supported by the video on-demand service. In another example, if the service is a financial institution enabling the movement of money from accounts, processing subsystem 114 may receive (e.g., from data node 104) functions such as withdrawal of funds, transfer of funds, etc. Thus, data node 104 may store a plurality of service identifiers and corresponding functions available for those service identifiers.

In some embodiments, the functions may be available based on a type of service (e.g., financial, video on-demand, etc.). Token processing subsystem 114 may determine, based on a type of the service and the function, that the function requires the service to communicate with the computing platform. For example, if the function is a playback command and the type of service is a video on-demand service, token processing subsystem 114 may determine that the computing platform may need to communicate with the service directly (e.g., for controlling playback of an on-demand video). Thus, token processing subsystem 114 may transmit, to the computing platform, instructions for executing the function against the service. In this case, access control system 102 may not act as a proxy between the computing platform in the service. The computing platform may communicate directly with the service. Thus, token processing subsystem 114 may transmit all possible commands in a particular format to the computing platform.

Token processing subsystem 114 may then encode the plurality of functions and the authentication data into the set of instructions for performing the plurality of functions. For example, each function may be associated with a particular format. In addition, one or more functions may require login credentials to be supplied so that the computing (e.g., virtual) platform is able to login into the account. For example, a function for transferring currency from one account to another account may require a single command (or a set of commands) to the financial institution that requires login credentials. Thus, the command or the set of commands may be encoded with login credentials and may be formatted so that they can be submitted to a computing device associated with the financial institution. In the example for accessing an on-demand video, the commands may need to be encoded based on the state of the video. For example, if the video is playing, a pause command may be encoded in such a way that the video is paused.

Token processing subsystem 114 may then encrypt the set of instructions into the cryptographic token using a key (e.g., a public key) associated with the cryptography-based storage application. For example, processing subsystem 114 may access the key (e.g., the public key) associated with the cryptography-based application of the user. Processing subsystem 114 may, for example, retrieve the key from a database on data node 104. The public key may have been added to the database when the user registered with access control system 102. In some embodiments, the identifier of the cryptography-based storage application may also be a key (e.g., a public key) that may be used to encrypt the set of instructions. Thus, token processing subsystem 114 may have retrieved the key from the generation request which may have included the identifier of the cryptography-based storage application. In some instances, the identifier of the cryptography-based storage application may be referred to as a wallet address or a cryptographic wallet address. Furthermore, token processing subsystem 114 may transmit a token creation request to a blockchain node of a blockchain. The blockchain node may commit the cryptographic token to the blockchain.

When the cryptographic token is created and committed to the blockchain it may be used for access control. However, only a key (e.g., a private key) associated with the cryptography-based storage application of the user is able to decrypt the instructions encrypted within the cryptographic token. Otherwise, the cryptographic token may be retrieved by any member of the public as blockchain technology enables anyone to read the data on the blockchain. Returning back to FIG. 1, when token processing subsystem 114 receives the encrypted token data (e.g., from a blockchain node via communication subsystem 112), token processing subsystem 114 may cause the data to be decrypted. In particular, processing subsystem 114 may transmit, to a client device of the user, a command to decrypt the encrypted token data into a set of instructions for interacting with the service. The set of instructions may include one or more functions enabled to be performed by the service. For example, token processing subsystem 114 may retrieve (e.g., from a database on data node 104) an identifier of a client device associated with the user that hosts the cryptography-based storage application of the user, the cryptography-based storage application that is enabled to decrypt (e.g., using a private key) the encrypted token data. The client device may receive the command and may use the private key to decrypt the encrypted token data into a set of instructions for interacting with the service.

Figure 4:
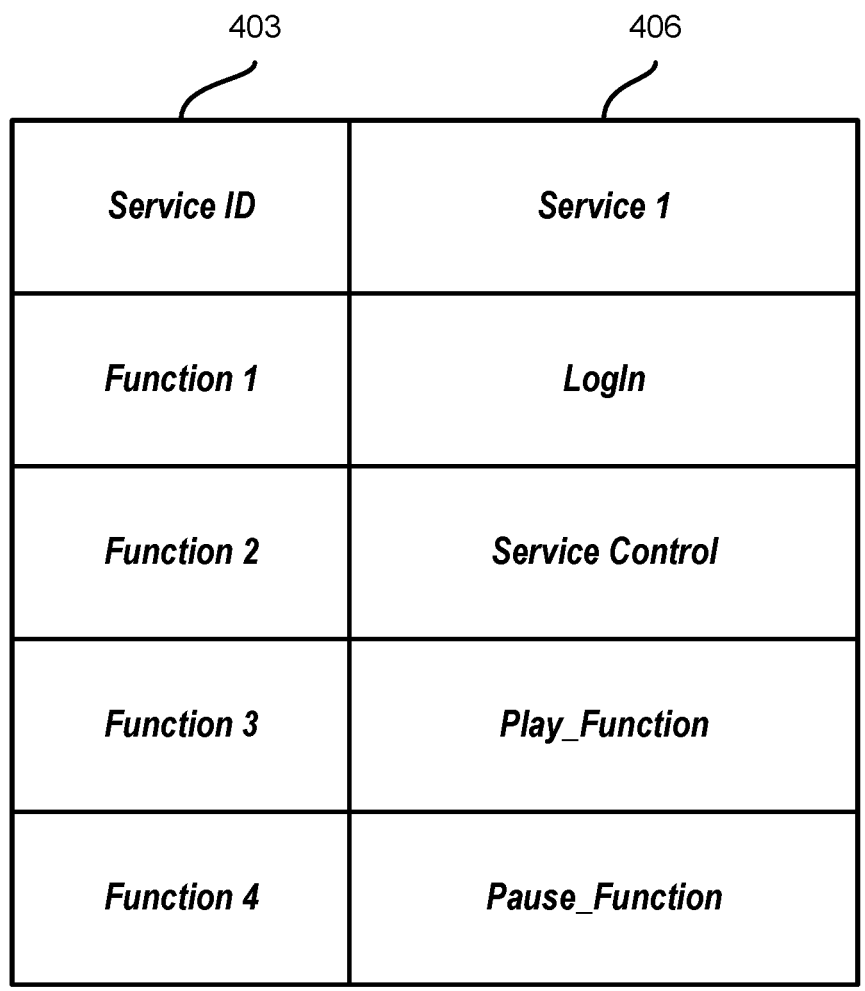
FIG. 4 illustrates a data structure representing different functions encoded in a cryptographic token, in accordance with one or more embodiments of this disclosure.
Figure 5:
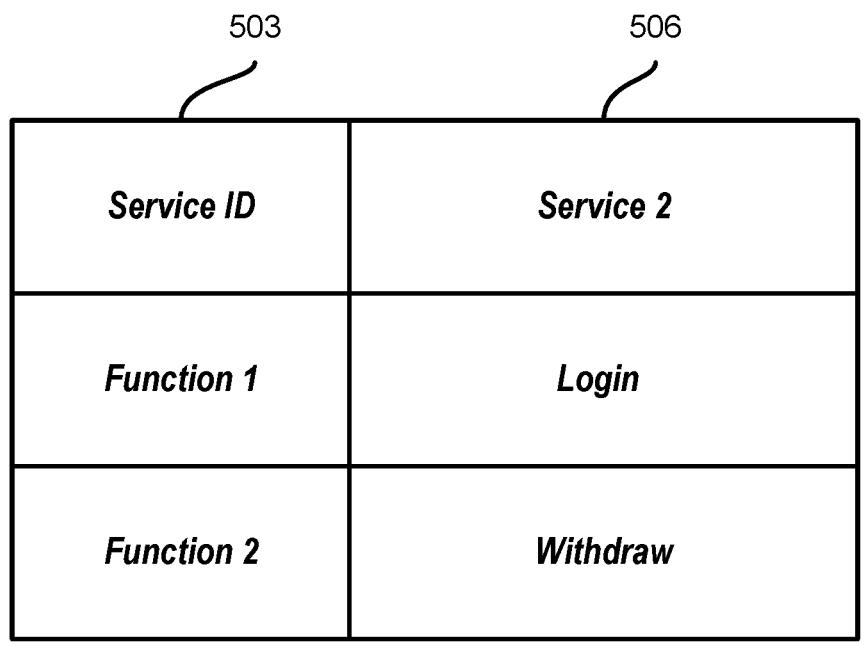
FIG. 5 illustrates another data structure representing different functions encoded in a cryptographic token, in accordance with one or more embodiments of this disclosure.

Access control system 102 may then receive from the client device (e.g., via communication subsystem 112), the set of instructions. Token processing subsystem 114 may receive the set of instructions and store those instructions, for example, in memory. In some embodiments, as discussed above, the set of instructions may include a plurality of functions enabled to be performed by the service. FIG. 4 illustrates a portion of an example data structure 400 of decrypted instructions. FIG. 4 illustrates possible instructions for an on-demand service. For example, name fields 403 may include function names such as a function for logging into the service, playing an on-demand video, and other suitable functions. Value fields 406 may include function execution data (e.g., strings, hexadecimal values, etc.) that enables a virtual platform to execute the function. FIG. 5 illustrates possible instructions for a financial service. For example, name fields 503 may include the names of functions while value field 506 may include, for example, strings for executing the functions. Other data may be included in both data structures of FIG. 4 and FIG. 5. For example, the other data may include instructions on how to encrypt the functions when sending that data to the corresponding service provider.

When access control system 102 receives the set of instructions, access control system 102 may pass the set of instructions to verification subsystem 116. Verification subsystem 116 may include software components, hardware components, or a combination of both. For example, verification subsystem 116 may include software components that access and/or execute programs using hardware. In some embodiments, verification subsystem 116 may determine a function within the set of instructions that corresponds to the access request. For example, each function may have a function identifier (e.g., a function name, a function number, or another suitable identifier). Verification subsystem 116 may compare the function identifiers received from the blockchain node with the function identifier (or function identifiers) within the request to identify the function.

In some embodiments, to perform the comparison, verification subsystem 116 may retrieve a plurality of function identifiers associated with a plurality of functions. The function identifiers may be stored within the cryptographic token and may be decrypted with the other encrypted data (e.g., as described above). In some embodiments, the function identifiers may be stored on a server such that the cryptographic token may include a uniform resource identifier that includes a link to the server (e.g., data node 104). Thus, verification subsystem 116 may query the server for the identifiers. Verification subsystem 116 may then determine that a first identifier of the plurality of function identifiers matches a function identifier within the access request. As discussed above, verification subsystem 116 may compare the function identifiers to determine the matching one.

Once verification subsystem 116 identifies the function, verification subsystem 116 may transmit, to the computing platform in response to the access request, a function command that enables the computing platform to execute the function via the service. For example, if the request is a request to transfer currency from one account to another, verification subsystem 116 may transmit the command directly to the computing platform (e.g., virtual platform). In another example, if a request is for a plurality of functions (e.g., for controlling playback of an on-demand video), verification subsystem may transmit multiple commands to the computing platform.

In some embodiments, verification subsystem 116 may also receive (e.g., as part of the original request) a status of the service. For example, if the on-demand video is in a paused state, that status may be sent to access control system 102. Thus, verification subsystem 116 may transmit back possible commands to resume playback, rewind, etc.

In some embodiments, verification subsystem 116 may act as a proxy for the computing system. Thus, verification subsystem 116 may transmit the function of the plurality of functions to a remote computing device associated with the service. That is, verification subsystem 116 may communicate with the service on behalf of the computing platform. Thus, the computing platform may send the commands to the service and the service may initiate a function (e.g., to play the on-demand video). In some embodiments, verification subsystem 116 may receive interaction data generated by the service in response to executing the function. For example, if the command instructs a financial institution to transfer currency from one account to another, the financial institution may transmit a response indicating the status of the command (e.g., whether the command successful or not successful). Verification subsystem 116 may then transmit, to the computing platform in response to the access request, an indication of whether the access request has been completed. That is, verification subsystem 116 may inform the user at the computing platform of success or failure of the operation. For example, verification subsystem 116 may transmit a message to the computing platform indicating whether the transfer was successful or has failed.

In some embodiments, when access control system 102 determines that it should not act as a proxy between the service and the computing platform, access control system 102 may transmit all of the commands to the computing platform for communicating with the service. For example, access control system 102 may provide a portion of interaction data generated as a result of interacting with the service to the user by providing the set of instructions to a first computing platform that the user is utilizing. Thus, access control system 102 may provide all available commands to that platform.

In some embodiments, a user may be able to use the same cryptographic token on multiple computing platforms. Thus, one of the advantages of using the cryptographic token is that blockchain data is readable by any computing platform and because of that, any computing platform may use the cryptographic token. In some embodiments, verification subsystem 116 may determine that the user is using a second computing platform. For example, the user may be simultaneously logged in into two platforms. However, the user may not use the computing platforms simultaneously. Thus, verification subsystem 116 may provide the set of instructions to the second computing platform in response to a second request from the user.

In some embodiments, the access request may include parameters to use with the command. Thus, verification subsystem 116 may retrieve one or more access request parameters for executing the function. For example, if the access request is to transfer currency from one account to another account, an access request parameter may be the amount. Some other access request parameters may include an account identifier (if there are multiple accounts), a type of account, etc. Verification subsystem 116 may then transmit the one or more access request parameters to a remote computing device associated with the service. For example, verification subsystem 116 may integrate the parameters into the command to the service. For example, the particular function may include a field for adding an amount for transfer, an account identifier, and/or other fields.

Computing Environment

Figure 6:
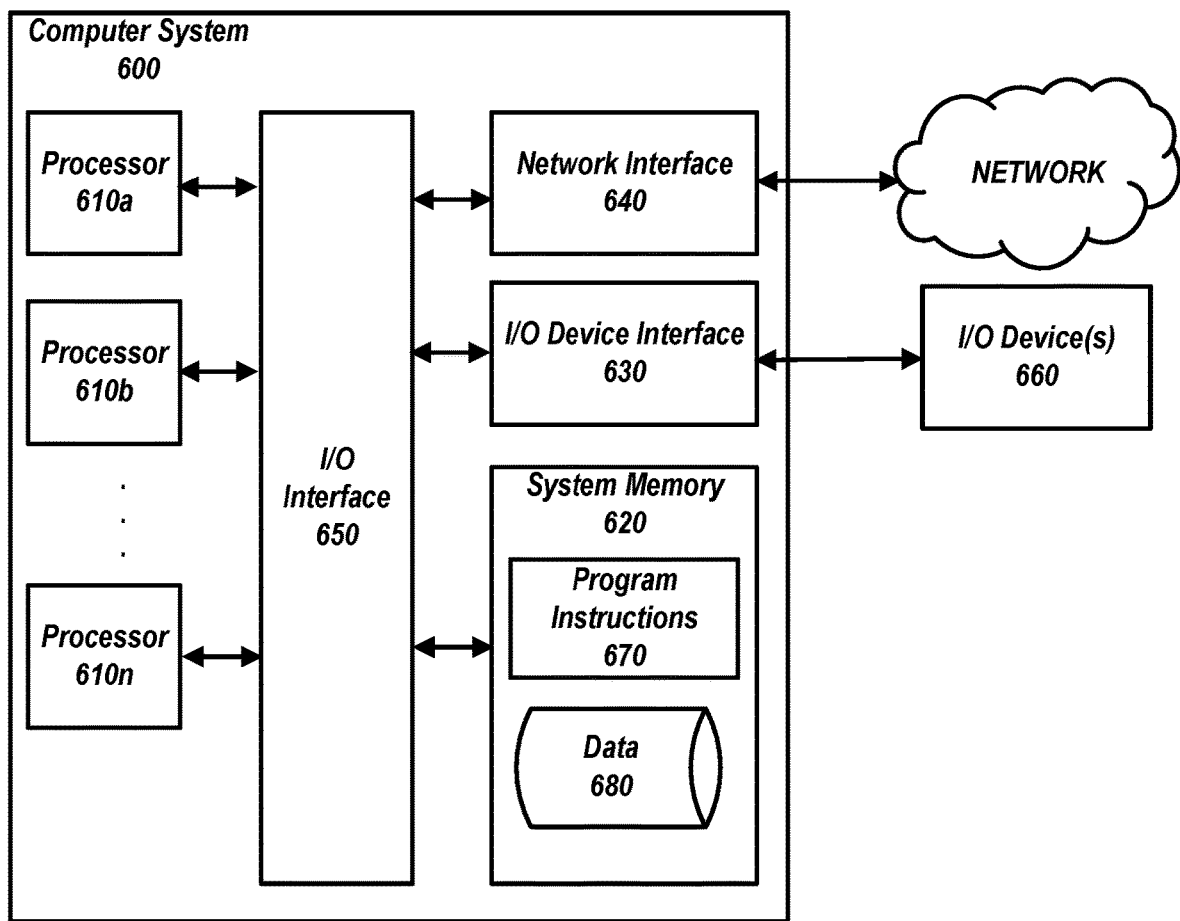
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
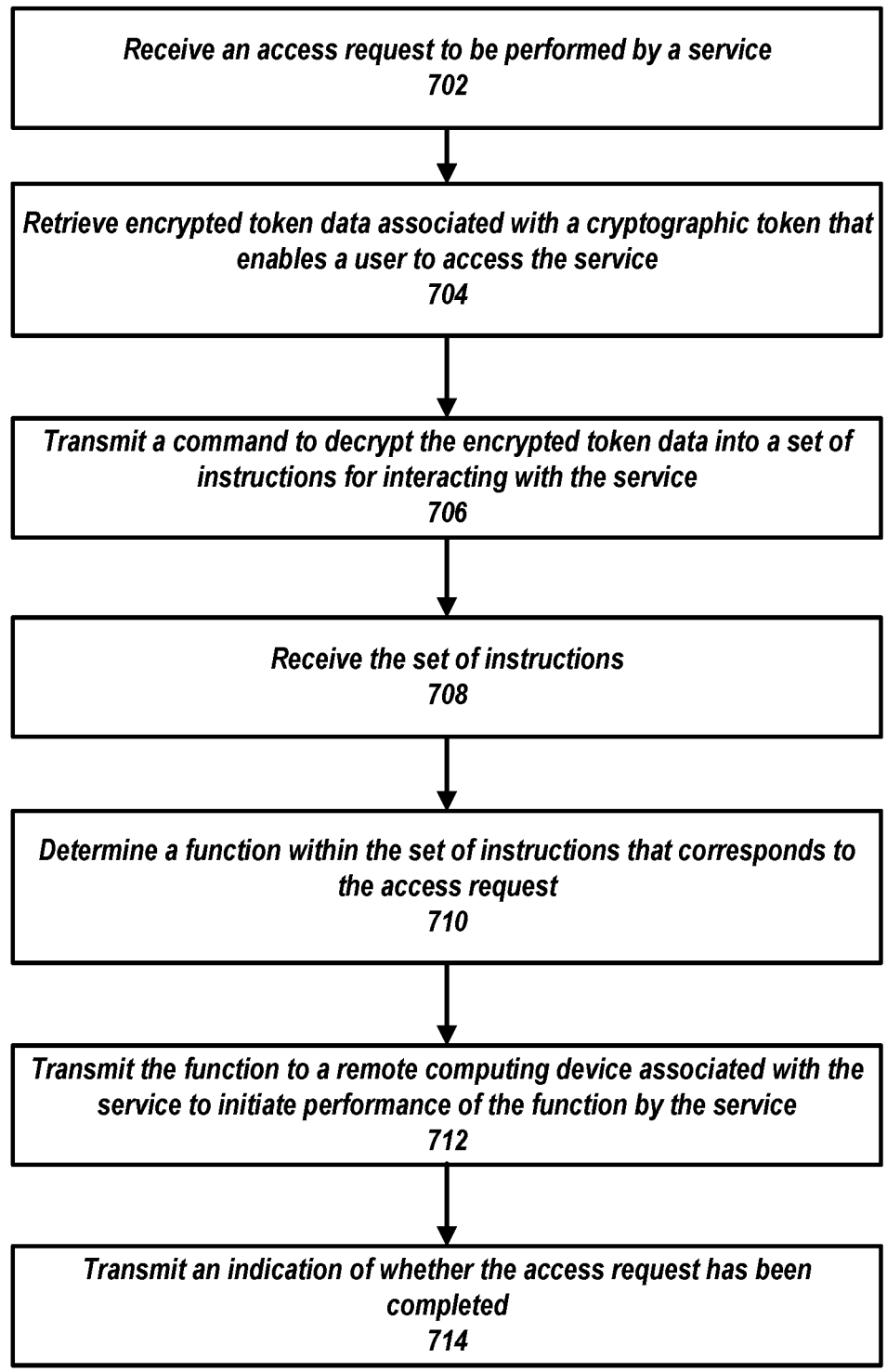
FIG. 7 is a flowchart of operations for using cryptographic tokens to port account resources to multiple computing platforms, in accordance with one or more embodiments of this disclosure.

FIG. 7 is a flowchart of operations for using cryptographic tokens to port account resources to multiple computing platforms. The operations of FIG. 7 may use components described in relation to FIG. 6. In some embodiments, access control system 102 may include one or more components of computer system 600. At 702, access control system 102 receives an access request to be performed by a service. For example, the access control system 102 may receive the access request from a computing platform of computing platforms 108a-108n. Access control system 102 may receive the access request using network interface 640 over network 150.

At 704, access control system 102 retrieves encrypted token data associated with a cryptographic token that enables a user to access the service. For example, access control system 102 may retrieve the encrypted token data from a blockchain using network interface 640 over network 150. Access control system 102 may use one or more processors 610a, 610b, and/or 610n to process the received encrypted token data. At 706, access control system 102 transmits a command to decrypt the encrypted token data into a set of instructions for interacting with the service. For example, access control system 102 may transmit the command using network interface 640 over network 150.

At 708, access control system 102 receives the set of instructions. For example, access control system 102 may receive the set of instructions using network interface 640 over network 150. Access control system 102 may use one or more processors 610a, 610b, and/or 610n to store the received set of instructions in system memory 620. At 710, access control system 102 determines a function within the set of instructions that corresponds to the access request. Access control system 102 may use one or more processors 610a, 610b, and/or 610n to perform this operation.

At 712, access control system 102 transmits the function to a remote computing device associated with the service to initiate performance of the function by the service. For example, access control system 102 may transmit the function using network interface 640 over network 150. At 714, access control system 102 transmits (e.g., to the computing platform) an indication of whether the access request has been completed. For example, access control system 102 may transmit the indication using network interface 640 over network 150.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flow-charts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for using account resources on multiple computing platforms, the method comprising: receiving, from a computing platform, an access request to be performed by a service; retrieving, via a blockchain node of a blockchain, encrypted token data associated with a cryptographic token that enables a user to access the service; transmitting, to a client device of the user, a command to decrypt the encrypted token data into a set of instructions for interacting with the service, the set of instructions comprising one or more functions enabled to be performed by the service; receiving, from the client device, the set of instructions; determining a function within the set of instructions that corresponds to the access request; and transmitting, to the computing platform in response to the access request, a function command that enables the computing platform to execute the function via the service.

2. Any of the preceding embodiments, wherein the access request comprises (1) an identifier of the cryptographic token that encodes encrypted instructions for interacting with the service, (2) a device identifier of the client device that controls the cryptographic token via a cryptography-based storage application, and (3) a service function to be performed by the service.

3. Any of the preceding embodiments, further comprising: receiving, from the client device storing the cryptography-based storage application, a token generation request for accessing the service, wherein the token generation request comprises (1) a service identifier of the service and (2) authentication data associated with the user; determining, based on the service identifier, a plurality of functions that the service is enabled to perform; encoding the plurality of functions and the authentication data into the set of instructions for performing the plurality of functions; and encrypting the set of instructions into the cryptographic token using a public key associated with the cryptography-based storage application.

4. Any of the preceding embodiments, further comprising: determining, based on a type of the service and the function, that the function requires the service to communicate with the computing platform; and transmitting, to the computing platform, instructions on executing the function against the service.

5. Any of the preceding embodiments, further comprising: retrieving one or more access request parameters for executing the function; and transmitting the one or more access request parameters to a remote computing device associated with the service.

6. Any of the proceeding embodiments, further comprising providing a portion of interaction data generated as a result of interacting with the service to the user by providing the set of instructions to a first computing platform that the user is utilizing.

7. Any of the preceding embodiments, further comprising: determining that the user is using a second computing platform; and providing the set of instructions to the second computing platform in response to a second request from the user.

8. Any of the preceding embodiments, wherein determining the function within the set of instructions that corresponds to the access request comprises: retrieving a plurality of function identifiers associated with a plurality of functions; and determining that a first identifier of the plurality of function identifiers matches a function identifier within the access request.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for using account resources on multiple computing platforms, the system comprising:
one or more processors; and
a non-transitory computer-readable storage medium storing instructions, which when executed by the one or more processors cause the one or more processors to perform operations comprising:
receiving, from a computing platform, an access request to be performed by a service, wherein the access request comprises (1) an identifier of a cryptographic token that encodes encrypted instructions for interacting with the service, (2) a device identifier of a client device that controls the cryptographic token via a cryptography-based storage application, and (3) a service function to be performed by the service;
retrieving, via a blockchain node of a blockchain, encrypted token data associated with the cryptographic token;
transmitting, using the device identifier, a command to the client device to decrypt the encrypted token data, wherein the client device receives the encrypted token data and decrypts the encrypted token data into a set of instructions for interacting with the service;
receiving, from the client device, the set of instructions, wherein the set of instructions comprises a plurality of functions enabled to be performed by the service;
determining a function within the set of instructions that matches the service function;
transmitting the function of the plurality of functions to a remote computing device associated with the service to initiate the service function to be performed by the service;
receiving interaction data generated by the service in response to executing the function; and
transmitting, to the computing platform in response to the access request, an indication of whether the access request has been completed.

2. The system of claim 1, wherein the instructions further cause the one or more processors to perform operations comprising:
receiving, from the client device storing the cryptography-based storage application, a token generation request for generating the cryptographic token for accessing the service via an account associated with a user, wherein the token generation request comprises (1) a service identifier of the service and (2) authentication data associated with the user;
determining, based on the service identifier, the plurality of functions that the service is enabled to perform;
encoding the plurality of functions and the authentication data into the set of instructions for performing the plurality of functions; and
encrypting the set of instructions into the cryptographic token using a public key associated with the cryptography-based storage application.

3. The system of claim 1, wherein the instructions further cause the one or more processors to perform operations comprising:
determining, based on a type of the service and the function, that the function requires the service to communicate with the computing platform; and
transmitting, to the computing platform, instructions on executing the function against the service.

4. The system of claim 1, wherein the instructions further cause the one or more processors to perform operations comprising:
retrieving one or more access request parameters for executing the function; and
transmitting the one or more access request parameters to the remote computing device associated with the service.

5. A method for using account resources on multiple computing platforms, the method comprising:
receiving, from a computing platform, an access request to be performed by a service, wherein the access request comprises an identifier of a cryptographic token that encodes encrypted instructions for interacting with the service and a device identifier of a client device that controls the cryptographic token via a cryptography-based storage application;
determining a plurality of functions that the service is enabled to perform;
encoding the plurality of functions and authentication data into a set of instructions for performing the plurality of functions;
encrypting the set of instructions into the cryptographic token using a public key associated with the cryptography-based storage application;
retrieving, via a blockchain node of a blockchain, encrypted token data associated with the cryptographic token that enables a user to access the service;
transmitting, to the client device of the user, a command to decrypt the encrypted token data into the set of instructions for interacting with the service, the set of instructions comprising one or more functions enabled to be performed by the service;
receiving, from the client device, the set of instructions;
determining a function within the set of instructions that corresponds to the access request; and
transmitting, to the computing platform in response to the access request, a function command that enables the computing platform to execute the function via the service.

6. The method of claim 5, wherein the access request further comprises a service function to be performed by the service.

7. The method of claim 6, further comprising:
receiving, from the client device storing the cryptography-based storage application, a token generation request for accessing the service, wherein the token generation request comprises (1) a service identifier of the service and (2) the authentication data associated with the user.

8. The method of claim 5, further comprising:
determining, based on a type of the service and the function, that the function requires the service to communicate with the computing platform; and
transmitting, to the computing platform, instructions on executing the function against the service.

9. The method of claim 5, further comprising:
retrieving one or more access request parameters for executing the function; and
transmitting the one or more access request parameters to a remote computing device associated with the service.

10. The method of claim 5, further comprising providing a portion of interaction data generated as a result of interacting with the service to the user by providing the set of instructions to a first computing platform that the user is utilizing.

11. The method of claim 10, further comprising:
determining that the user is using a second computing platform; and
providing the set of instructions to the second computing platform in response to a second request from the user.

12. The method of claim 5, wherein determining the function within the set of instructions that corresponds to the access request comprises:
retrieving a plurality of function identifiers associated with a plurality of functions; and
determining that a first identifier of the plurality of function identifiers matches a function identifier within the access request.

13. A non-transitory, computer-readable storage medium storing instructions that when executed by one or more processors cause the one or more processors to perform operations comprising:
receiving, from a computing platform, an access request to be performed by a service, wherein the access request comprises an identifier of a cryptographic token that encodes encrypted instructions for interacting with the service and a device identifier of a client device that controls the cryptographic token via a cryptography-based storage application;
determining a plurality of functions that the service is enabled to perform;
encoding the plurality of functions and authentication data into a set of instructions for performing the plurality of functions;
encrypting the set of instructions into the cryptographic token using a public key associated with the cryptography-based storage application;
retrieving, via a blockchain node of a blockchain, encrypted token data associated with the cryptographic token that enables a user to access the service;
transmitting, to the client device of the user, a command to decrypt the encrypted token data into the set of instructions for interacting with the service, the set of instructions comprising one or more functions enabled to be performed by the service;
receiving, from the client device, the set of instructions; and
transmitting, to the computing platform in response to the access request, the set of instructions for executing by the service.

14. The non-transitory, computer-readable storage medium of claim 13, wherein the access request further comprises a service function to be performed by the service.

15. The non-transitory, computer-readable storage medium of claim 14, wherein the instructions further cause the one or more processors to perform operations comprising:
receiving, from the client device storing the cryptography-based storage application, a token generation request for accessing the service, wherein the token generation request comprises (1) a service identifier of the service and (2) the authentication data associated with the user.

16. The non-transitory, computer-readable storage medium of claim 13, wherein the instructions further cause the one or more processors to perform operations comprising:
determining, based on a type of the service and a function of the one or more functions, that the function requires the service to communicate with the computing platform; and
transmitting, to the computing platform, instructions on executing the function against the service.

17. The non-transitory, computer-readable storage medium of claim 13, wherein the instructions further cause the one or more processors to perform operations comprising:
retrieving one or more access request parameters for executing a function of the one or more functions; and
transmitting the one or more access request parameters to a remote computing device associated with the service.

18. The non-transitory, computer-readable storage medium of claim 13, wherein the instructions further cause the one or more processors to provide a portion of interaction data generated as a result of interacting with the service to the user by providing the set of instructions to a first computing platform that the user is utilizing.

19. The non-transitory, computer-readable storage medium of claim 18, wherein the instructions further cause the one or more processors to perform operations comprising:
determining that the user is using a second computing platform; and
providing the set of instructions to the second computing platform in response to a second request from the user.

20. The non-transitory, computer-readable storage medium of claim 13, wherein the instructions further cause the one or more processors to perform operations comprising:
determining a function within the set of instructions that corresponds to the access request by retrieving one or more function identifiers associated with the one or more functions; and
determining that a first identifier of the one or more function identifiers matches a function identifier within the access request.

* * * * *